United States Patent
Iwakuni

(10) Patent No.: US 10,472,501 B2
(45) Date of Patent: Nov. 12, 2019

(54) RUBBER COMPOSITION FOR TIRE TREAD AND METHOD FOR PRODUCING THE SAME

(71) Applicant: Toyo Tire & Rubber Co., Ltd., Osaka-shi, Osaka (JP)

(72) Inventor: Keisuke Iwakuni, Osaka (JP)

(73) Assignee: Toyo Tire Corporation, Itami-shi (JP)

( * ) Notice: Subject to any disclaimer, the term of this patent is extended or adjusted under 35 U.S.C. 154(b) by 308 days.

(21) Appl. No.: 15/268,799

(22) Filed: Sep. 19, 2016

(65) Prior Publication Data
US 2017/0088699 A1     Mar. 30, 2017

(30) Foreign Application Priority Data

Sep. 28, 2015    (JP) ................................ 2015-190187

(51) Int. Cl.
     *C08L 9/00*         (2006.01)
     *B60C 1/00*         (2006.01)
     *C08L 7/00*         (2006.01)

(52) U.S. Cl.
     CPC .............. *C08L 9/00* (2013.01); *B60C 1/0016* (2013.01); *C08L 7/00* (2013.01)

(58) Field of Classification Search
     CPC ............. B60C 1/0016; C08L 7/00; C08L 9/00
See application file for complete search history.

(56) References Cited

U.S. PATENT DOCUMENTS

2015/0080493 A1     3/2015   Kamada

FOREIGN PATENT DOCUMENTS

| JP | 61155307 | * | 7/1986 |
| JP | 1-163228 A | | 6/1989 |
| JP | 2000-247105 A | | 9/2000 |
| JP | 2010-185025 A | | 8/2010 |
| JP | 2011-12110 A | | 1/2011 |
| JP | 2013-177501 | * | 9/2013 |
| JP | 2015-59169 A | | 3/2015 |
| KR | 20100031418 | * | 3/2010 |

OTHER PUBLICATIONS

Office Action dated Dec. 22, 2017, issued in counterpart Chinese Application No. 201610853244.3, with partial English translation. (7 pages).
Office Action dated Jun. 4, 2019, issued in counterpart JP Application No. 2015-190187, with English translation (8 pages).

* cited by examiner

*Primary Examiner* — Stella K Yi
(74) *Attorney, Agent, or Firm* — Westerman, Hattori, Daniels & Adrian, LLP

(57) ABSTRACT

A rubber composition for a tire tread that can suppress increase of rubber hardness due to migration of an oil with time is provided. The rubber composition for a tire tread includes a diene rubber, an oil, and oil absorptive polymer particles having an oil absorption value of from 100 to 1,500 ml/100 g, wherein the content of the oil absorptive polymer particles is from 2.5 to 60 parts by mass per 100 parts by mass of the oil. A pneumatic tire having a tread rubber comprising the rubber composition is provided.

10 Claims, No Drawings

RUBBER COMPOSITION FOR TIRE TREAD AND METHOD FOR PRODUCING THE SAME

CROSS-REFERENCE TO RELATED APPLICATIONS

This application is based upon and claims the benefit of priority from the prior Japanese Patent Application No. 2015-190187, filed on Sep. 28, 2015; the entire contents of which are incorporated herein by reference.

BACKGROUND

1. Technical Field

The present invention relates to a rubber composition suitable for use in a tire tread, a method for producing the rubber composition, a pneumatic tire using the rubber composition, and a method for manufacturing the pneumatic tire.

2. Related Art

Various technologies are proposed in a tread rubber of a pneumatic tire in order to improve running performance on an ice-covered road surface (that is, on-ice performance) and running performance on a wet road surface (that is, wet performance). For example, JP-A-2015-059169 discloses adding an acid-treated silk powder to a tread rubber in order to improve on-ice performance. Further technical development for improving running performance of a tire is required in order to sufficiently respond to a market demand.

Oil that is a petroleum softener is generally added to a tread rubber. The oil migrates with time (bleeding to a rubber surface or migration to surrounding rubbers). Therefore, there is a problem that rubber hardness of a tread rubber increases by the migration of oil, and this causes deterioration of tire performance after passing of years.

JP-A-H01-163228 proposes adding an oil gelling agent (for example, N-lauroyl-L-glutamic acid-α,γ-di-n-butylamide) to an age resister in order to improve ozone crack resistance by an age resister. However, this patent document discloses that an age resister is gelled by an oil gelling agent, and does not disclose use of oil absorptive polymer particles and suppression of hardness increase by migration of an oil.

SUMMARY

The present embodiment has been made in view of the above problems, and an object of the present embodiment is to provide a rubber composition for a tire tread that can suppress increase of rubber hardness due to migration of an oil with time.

The rubber composition for a tire tread according to the present embodiment comprises a diene rubber, an oil, and oil absorptive polymer particles having an oil absorption value of from 100 to 1,500 ml/100 g. wherein the content of the oil absorptive polymer particles is from 2.5 to 60 parts by mass per 100 parts by mass of the oil.

As one embodiment, a rubber composition for a tire tread comprises an oil-polymer composite comprising oil absorptive polymer particles having an oil absorption value of from 100 to 1,500 ml/100 g and an oil absorbed therein, and a diene rubber, wherein the content of the oil absorptive polymer particles is from 2.5 to 60 parts by mass per 100 parts by mass of the oil contained in the rubber composition.

A pneumatic tire according to the present embodiment has a tread rubber comprising the rubber composition.

A method for producing a rubber composition for a tire tread according to an embodiment comprises mixing an oil-polymer composite comprising oil absorptive polymer particles having an oil absorption value of from 100 to 1,500 ml/1.00 g and an oil absorbed therein with a diene rubber.

A method for manufacturing a pneumatic tire according to an embodiment comprises manufacturing an unvulcanized tire containing a tread rubber member produced using the rubber composition obtained by the above-described production method, and vulcanization-molding the vulcanized tire.

According to the rubber composition of the present embodiment, increase of hardness of a tread rubber due to migration of an oil with time can be suppressed.

DETAILED DESCRIPTION

Elements for carrying out the present embodiment are described in detail below.

The rubber composition according to the present embodiment comprises a diene rubber, an oil, and oil absorptive polymer particles.

Examples of the diene rubber that can be used as a rubber component include various diene rubbers that are generally used in a rubber composition for a tire tread, such as natural rubber (NR), polyisoprene rubber (IR), polybutadiene rubber (BR), styrene-butadiene rubber (SBR), styrene-isoprene copolymer rubber; butadiene-isoprene copolymer rubber and styrene-isoprene-butadiene copolymer rubber. Those diene rubbers can be used alone or as blends of two or more thereof. More preferred diene rubber is at least one selected from the group consisting of natural rubber, polybutadiene rubber and styrene-butadiene rubber.

As one embodiment, the diene rubber may be natural rubber alone, and may be a blend of natural rubber and other diene rubber (for example, polybutadiene rubber). In the case of the blend, 100 parts by mass of the diene rubber may comprise from 30 to 80 parts by mass of natural rubber and from 20 to 70 parts by mass of the other diene rubber (for example, polybutadiene rubber).

Various oils that are added to rubber compositions can be used as the oil. A mineral oil comprising hydrocarbon as a main component is preferably used as the oil. Specifically, at least one mineral oil selected from the group consisting of paraffinic oil, naphthenic oil and aromatic oil is preferably used.

The content of the oil contained in the rubber composition is not particularly limited. For example, the content of the oil may be from 5 to 50 parts by mass, may be from 10 to 40 parts by mass, and may be from 10 to 30 parts by mass, per 100 parts by mass of the diene rubber.

The oil absorptive polymer particles used have an oil absorption value of from 100 to 1,500 ml/100 g. When the oil absorptive polymer particles having such a high oil absorption value are added together with the oil, running performance of a tire, such as on-ice performance or wet performance, can be improved, and additionally, increase of hardness of a tread rubber by migration of the oil with time can be suppressed. The reason for this is assumed as follows, although not particularly limited. The oil absorptive polymer particles are in the state of being dispersed in the diene rubber (as the rubber component) as a matrix (continuous phase). Because the oil contained in the rubber composition is absorbed in or adsorbed on the oil absorptive polymer particles, it is considered that migration of the oil with the time can be reduced, and as a result, increase of hardness of a tread rubber can be suppressed. Thus, when increase of hardness of a tread rubber can be suppressed, decrease of performance of the tread rubber with time can be suppressed. Furthermore, it is considered that the oil absorptive polymer particles gelled (that is, swelled) by absorbing the oil in a vulcanized rubber form a phase that can hardly contain filler, and this increases hysteresis loss. As a result, running performance of a tire, such as wet performance, can be improved. Furthermore, it is considered that the oil-absorbed or adsorbed oil absorptive polymer particles develop adhesion effect, thereby on-ice performance is improved.

When the oil absorption value of the oil absorptive polymer particles is 100 ml/100 g or more as described above, migration of the oil with time can be suppressed. Furthermore, when the oil absorption value is 1,500 ml/100 g or less, decrease of abrasion resistance can be suppressed. The oil absorption value is preferably from 300 to 1,300 ml/100 g, more preferably from 500 to 1,200 ml/100 g, and may be from 700 to 1,200 ml/100 g.

The oil absorption value used in the present specification is a maximum value of the oil absorbable per 100 g of the oil absorptive polymer particles (oil, absorption value in a saturated state), and is a value measured by JIS K5101-13-1.

In one embodiment, the oil absorptive polymer particles have a glass transition temperature (Tg) of preferably from −70 to −50° C., and more preferably from −60 to −50° C. When the glass transition temperature of the oil absorptive polymer particles is in the vicinity of −60° C., it advantageously acts on wet performance and on-ice performance. The glass transition temperature is a value measured using a differential scanning calorimetry (DSC) according to JIS K7121 (temperature rising rate: 20° C./min).

In one embodiment, it is preferred that the oil absorptive polymer particles are porous. The porous particles advantageously act on wet performance and on-ice performance.

Average particle diameter of the oil absorptive polymer particles average particle diameter in an oil-unabsorbed state) is not particularly limited, and is, for example, from 10 to 1,000 μm, preferably from 100 to 800 μm, and more preferably from 300 to 700 μm. The average particle diameter used herein is obtained as follows. Particles are observed with a scanning electron microscope (SEM) to obtain an image, diameters of 50 particles arbitrarily extracted are measured using the image, and the average particle diameter is obtained as its arithmetic mean. The diameter of the particles can be an average value of values obtained by connecting two points of the periphery of a particle and measuring diameters passing through the center of gravity in increments of 2° using, for example, an image processing software "Image-Pro Plus" manufactured by Media Cybernetics.

The oil absorptive polymer particles having the properties as described above are commercially available as "AQUA N-CAP" from Meitoh Kasei Co., Ltd., and can be preferably used, AQUA N-CAP is a granular powder comprising a thermoplastic block copolymer, and is oil absorptive thermoplastic polymer particles. AQUA N-CAP has lipophilic hydrophobicity that absorbs an oil but does not absorb water, and can microencapsule an oil. Specifically, AQUA N-CAP swells by absorbing an oil and can hold the oil therein.

The content of the oil absorptive polymer particles contained in the rubber composition is from 2.5 to 60 parts by mass per 100 parts by mass of the oil. When the content is 2.5 parts by mass or more, migration of the oil with time can be suppressed, and additionally, running performance of a tire, such as on-ice performance, can be improved. When the content is 60 parts by mass or less, deterioration of abrasion resistance can be suppressed. The content of the oil absorptive polymer particles is preferably from 10 to 60 parts by mass, and may be from 15 to 50 parts by mass, per 100 parts by mass of the oil.

The addition amount of the oil absorptive polymer particles to the diene rubber as the rubber component forming a continuous phase is not particularly limited. The content of the oil absorptive polymer particles contained in the rubber composition is, for example, preferably from 0.1 to 20 parts by mass, and more preferably from 0.5 to 15 parts by mass, per 100 parts by mass of the diene rubber.

In one embodiment, the oil absorptive polymer particles and oil may be added in the form of an oil-polymer composite comprising the oil absorptive polymer particles and the oil absorbed therein. Specifically, the oil is previously mixed with the oil absorptive polymer particles to absorb the oil in the oil absorptive polymer particles, and the thus obtained oil absorptive polymer particles containing the oil are added to the diene rubber, followed by mixing. The oil-polymer composite contains the oil absorptive polymer particles and the oil absorbed in the absorptive polymer particles, and by adding the oil-polymer composite during kneading rubber, the suppression effect of migration of an oil with time and the improvement effect of tire running performance can be further enhanced.

In the oil-polymer composite, the proportions of the oil and the oil absorptive polymer particles are that the amount of the oil absorptive polymer particles may be from 8 to 60 parts by mass, may be from 10 to 60 parts by mass, may be from 12 to 50 parts by mass, and may be from 15 to 50 parts by mass, per 100 parts by mass of the oil.

In the rubber composition according to the preferred one embodiment, which contains the oil-polymer composite, additional oil absorptive polymer particles and/or oil may be contained or may not be contained. It is preferred that 50 mass % or more (preferably 80 mass % or more) of the oil absorptive polymer particles is added as the oil-polymer composite. In any event, when the oil-polymer composite is added, the content of the oil absorptive polymer particles and oil (content including those that are not derived from the composite) contained in the rubber composition is the same as the case that the oil-polymer composite is not used, and the content is as follows. The content of the oil absorptive polymer particles is from 2.5 to 60 parts by mass, preferably from 10 to 60 parts by mass, and more preferably from 15 to 50 parts by mass, per 100 parts by mass of the oil. Furthermore, the content of the oil contained in the rubber composition may be from 5 to 50 parts by mass, may be from 10 to 40 parts by mass, and may be from 10 to 30 parts by mass, per 100 parts by mass of the diene rubber. The content of the oil absorptive polymer particles contained in the rubber composition may be from 0.1 to 20 parts by mass, and may be from 0.5 to 15 parts by mass, per 100 parts by mass of the diene rubber.

The rubber composition according to the present embodiment can appropriately contain compounding chemicals that are generally used in rubber industries, such as a reinforcing filler such as carbon black or silica, zinc flower, stearic acid, a wax, an age resister (amine-ketone type, aromatic secondary amine type, phenol type, imidazole type or the like), a vulcanizing agent or a vulcanization accelerator (guanidine type, thiazole type, sulfenamide type, thiuram type or the like) in ordinary ranges, in addition to the above-described components.

Carbon black as the reinforcing filler is not particularly limited, and can use the conventional various kinds of carbon black. For example, SAP grade (N100 Series), ISAF grade (N200 Series), HAP grade (N300 Series) and PEP grade (N500 Series) (those are ASTM grade) are preferably used. Carbon blacks of those grades can be used alone or as mixtures of two or more thereof.

Silica is not particularly limited, but wet silica such as wet precipitated silica or wet gelled silica is preferably used. When silica is added, it is preferred to use the silica together with a silane coupling agent such as sulfide silane or mercaptosilane, and the amount of the silane coupling agent added is preferably from 2 to 20 mass % based on the amount of the silica added.

The addition amount of the reinforcing filler comprising carbon black and/or silica is not particularly limited. For example, the amount of the reinforcing filler added may be from 10 to 150 parts by mass, may be from 20 to 100 parts by mass, and may be from 30 to 80 parts by mass, per 100 parts by mass of the diene rubber. Carbon black alone or a combination of carbon black and silica is preferably used as the reinforcing filler.

Examples of the vulcanizing agent include sulfurs such as powdered sulfur, precipitated sulfur, colloidal sulfur, insoluble sulfur and highly dispersive sulfur. Although not particularly limited, the amount of the vulcanizing agent added is preferably from 0.1 to 10 parts by mass, and more preferably from 0.5 to 5 parts by mass, per 100 parts by mass of the diene rubber. The amount of the vulcanization accelerator added is preferably from 0.1 to 7 parts by mass, and more preferably from 0.5 to 5 parts by mass, per 100 parts by mass of the diene rubber.

The rubber composition according to the present embodiment may further contain at least one anti-slip material selected from the group consisting of a ground product of vegetable porous carbonized material, porous cellulose particles and vegetable granular material in order to further improve on-ice performance. The ground product of porous carbonized material used herein is a product obtained by grinding a porous substance comprising a solid product comprising carbon as a main component obtained by carbonizing vegetables such as wood or bamboo as a material, and, example thereof includes a ground product of bamboo charcoal (bamboo charcoal ground product). Examples of the porous cellulose particles include cellulose particles obtained by adding a pore making agent to an alkali-type cellulose solution such as viscose and simultaneously proceeding coagulation/regeneration of cellulose and foaming by the pore making agent. Specific example of the porous cellulose particles is "VISCOPEARL" manufactured by Rengo Co., Ltd. Examples of the vegetable granular material include ground products obtained by grinding at least one selected from the group consisting of a shell of seeds, a stone of fruits, grain and its core. Specific example of the vegetable granular material is a ground product of walnut. When those anti-slip materials are added, the addition amount thereof is preferably from 1 to 10 parts by mass per 100 parts by mass of the diene rubber.

The rubber composition according to the present embodiment can be prepared by kneading the necessary components according to the conventional method using a mixing machine generally used, such as Banbury mixer, a kneader or rolls. Specifically, other additives excluding a vulcanizing agent and a vulcanization accelerator are added to a diene rubber together with an oil and oil absorptive polymer particles, followed by mixing, in a nonproductive mixing step, and a vulcanizing agent and a vulcanization accelerator are then added to the mixture thus obtained, followed by mixing, in a productive mixing step. Thus, a rubber composition can be prepared.

In the nonproductive mixing step, an oil and oil absorptive polymer particles may be added to the diene rubber, respectively, followed by mixing, or an oil-polymer composite comprising oil absorptive polymer particles and an oil absorbed therein (that is, a mixture of oil absorptive polymer particles and an oil) may be added to the diene rubber, followed by mixing. Furthermore, the oil-polymer composite may be added, and additional oil and/or oil absorptive polymer particles may be further added, followed by mixing. A method for preparing the oil-polymer composite includes a method of stirring the oil absorptive polymer particles and the oil using a stirring machine, and allowing to stand the resulting mixture for a given period of time.

The rubber composition thus obtained is used in a tread rubber constituting a ground contact surface of a pneumatic tire. Examples of the tire include pneumatic tires for various uses and having various sizes, such as tires for passenger cars or tires for heavy load of trucks or buses. Furthermore, the rubber composition can be used in various kinds of tires, such as winter tires such as a studless tire or a snow tire, summer tires or all season tires. The tread rubber of a pneumatic tire includes a tread rubber comprising a two-layered structure of a cap rubber and a base rubber, and a single layer structure in which those are integrated. The rubber composition is preferably used in a rubber constituting a ground contact surface. That is, it is preferred that when the tread rubber has a single layer structure, the tread rubber comprises the rubber composition, and when the tread rubber has a two-layered structure, the cap rubber comprises the rubber composition.

The manufacturing method of a pneumatic tire is not particularly limited. For example, the rubber composition is molded into a given shape by extrusion processing according to the conventional method to form an unvulcanized tread rubber member, and the tread rubber member obtained is combined with other parts, thereby manufacturing an unvulcanized tire (green tire). The green tire obtained is then vulcanization-molded at a temperature of, for example, from 140 to 180° C. Thus, a pneumatic tire can be manufactured.

EXAMPLES

Examples of the present embodiment are described below, but the present invention is not construed as being limited to those examples.

Banbury mixer was used. Compounding ingredients excluding sulfur and a vulcanization accelerator were added to a diene rubber according to the formulations (parts by mass) shown in Table 1 below, followed by kneading, in a nonproductive mixing step (discharge temperature: 160° C.). Sulfur and a vulcanization accelerator were added to the kneaded material obtained, followed by kneading, in a productive mixing step (discharge temperature: 90° C.). Thus, a rubber composition for a tire tread was prepared. The details of each component in Table 1 are as follows.

NR: Natural rubber, RSS#3

BR: "BR150B" manufactured by Ube Industries Ltd.

Carbon black: "SEAST KIT (N339)" manufactured by Tokai Carbon Co., Ltd.

Silica: "NIPSIL AQ" manufactured by Tosoh Silica Corporation

Oil: Paraffinic oil, "PROCESS P200" manufactured by JX Nippon Oil & Energy Corporation Silane coupling agent: "Si69" manufactured by Evonik Oil absorptive polymer particle: "AQUA N-CAP" (oil absorption value: 1,000 ml/100 g, Tg: −56° C., average particle diameter: 500 μm) manufactured by Meitoh Kasei Co., Ltd.

Oil-polymer composite 1: Composite obtained by previously mixing 100 parts by mass of an oil (PROCESS P200) and 25 parts by mass of oil absorptive polymer particles (AQUA N-CAP) and allowing the resulting mixture to stand for 24 hours. The mixing is carried out by placing an oil and oil absorptive polymer particles in a given vessel and stirring the resulting mixture by a general propeller type blade stirring machine (number of revolution: 60 min$^{-1}$, temperature: 50° C., time: 3 min).

Oil-polymer composite 2: Composite obtained by previously mixing 100 parts by mass of an oil (PROCESS P200) and 50 parts by mass of oil absorptive polymer particles (AQUA N-CAP) and allowing the resulting mixture to stand for 24 hours. The mixing method is the same as in the oil-polymer composite 1.

Polymethyl methacrylate: "Polymethyl Methacrylate" manufactured by Tokyo Chemical Industry Co., Ltd. (oil absorption value: 46.8 ml/100 g)

Silicone resin powder: "TOSPEARL 2000B" (oil absorption value: 16.1 ml/100 g) manufactured by Momentive Performance Materials Japan LLC Oil gelling agent: N-lauroyl-L-glutamic acid-α,γ-di-n-butylamide, "COAGULAN GP-1" manufactured by Ajinomoto Co., Inc.

Stearic acid: "LUNAC S-20" manufactured by Kao Corporation

Zinc flower: "Zinc Flower #1" manufactured by Mitsui Mining & Smelting Co., Ltd.

Wax: "OZOACE 0355" manufactured by Nippon Seiro Co., Ltd.

Age resister: "NOCRAC 6C" manufactured by Ouchi Shinko Chemical Industrial Co., Ltd.

Vulcanization accelerator: "NOCCLER D" manufactured by Ouchi Shinko Chemical Industrial Co., Ltd.

Sulfur: "POWDERED SULFUR" manufactured b) Tsurumi Chemical Industry Co., Ltd.

A test piece having a given shape was prepared by vulcanizing each rubber composition obtained at 160° C. for 30 minutes. Using each test piece, abrasion resistance was evaluated. Furthermore, a pneumatic tire for passenger cars was manufactured using each rubber composition. Two kinds of pneumatic tires, a studless tire (tire size: 195/65R15) and a summer tire (tire size: 215/45ZR17), were manufactured. Each rubber composition was used in a tread rubber of each tire, and each tire was vulcanization-molded according to the conventional method. Thus, each tire was manufactured. The studless tire was evaluated for on-ice performance and an increasing index of aging hardness, and the summer tire was evaluated for wet performance. Each evaluation method is as follows.

Abrasion resistance: Abrasion loss was measured under the conditions of load: 40N and slip ratio: 30% according to JIS K6264 using Lamboun abrasion tester manufactured by Iwamoto Seisakusho, and was indicated by an index in the form of an inverse number of abrasion loss as the value of Comparative Example 1 being 100. The results show that abrasion loss is small as the index is large, and abrasion resistance is excellent.

Increasing index of aging hardness: A tire was subjected to an air heat aging treatment under the conditions of 80° C. and 168 hours, and hardness of a tread rubber surface before and after the aging treatment was measured. Increasing rate of rubber hardness due to heat aging, that is, an increasing rate (%) of aging hardness, was calculated by (rubber hardness after aging treatment/rubber hardness before aging treatment)×100. The rubber hardness was measured in an atmosphere of 23° C. using durometer Type A according to JIS K6253. The increasing rate of aging hardness calculated was indicated by an index (increasing index of aging hardness) as the value of Comparative Example 1 being 100. Smaller index means that hardening of a rubber composition due to heat aging was suppressed.

On-ice performance: Four tires were mounted on a 4WD car of 2,000 cc displacement. ABS was operated from 40 km/hr running on an ice-floe road (air temperature: −3±3° C.) and a braking distance was measured (average value of n=10). Inverse number of a braking distance was indicated by an index as the value of Comparative Example 1 being 100. The results show that braking distance is short as the index is increased, and large index indicates excellent braking performance on an ice-covered road surface.

Wet performance: Four tires were mounted on a passenger car, and the car run on a road surface on which water was sprayed in a depth of from 2 to 3 mm. Friction coefficient was measured at a speed of 100 km per hour. Wet grip performance was evaluated and indicated by an index as the value of Comparative Example 1 being 100. The results show that friction coefficient is large as the index is increased, and wet grip performance is excellent.

The results obtained are shown in Table 1 below.

TABLE 1

|  | Com. Ex. 1 | Com. Ex. 2 | Com. Ex. 3 | Com. Ex. 4 | Com. Ex. 5 | Com Ex. 6 | Ex. 1 | Ex. 2 | Ex. 3 | Ex. 4 | Ex. 5 |
|---|---|---|---|---|---|---|---|---|---|---|---|
| Formulation (parts by mass) | | | | | | | | | | | |
| NR | 50 | 50 | 50 | 50 | 50 | 50 | 50 | 50 | 50 | 50 | 50 |
| BR | 50 | 50 | 50 | 50 | 50 | 50 | 50 | 50 | 50 | 50 | 50 |
| Carbon black | 25 | 25 | 25 | 25 | 25 | 25 | 25 | 25 | 25 | 25 | 25 |
| Silica | 25 | 25 | 25 | 25 | 25 | 25 | 25 | 25 | 25 | 25 | 25 |
| Oil | 20 | 20 | 20 | 20 | 20 | 20 | 20 | 20 | 20 | | |
| Silane coupling agent | 2.0 | 2.0 | 2.0 | 2.0 | 2.0 | 2.0 | 2.0 | 2.0 | 2.0 | 2.0 | 2.0 |
| Oil absorptive polymer particle | | | | | 0.1 | 60 | 2.5 | 5.0 | 10 | | |
| Oil-polymer composite 1 | | | | | | | | | | 25 | |
| Oil-polymer composite 2 | | | | | | | | | | | 30 |
| Polymethyl methacrylate | | | 5.0 | | | | | | | | |
| Silicone resin powder | | | | 5.0 | | | | | | | |
| Oil gelling agent | | 5.0 | | | | | | | | | |
| Stearic acid | 2.0 | 2.0 | 2.0 | 2.0 | 2.0 | 2.0 | 2.0 | 2.0 | 2.0 | 2.0 | 2.0 |
| Zinc flower | 2.0 | 2.0 | 2.0 | 2.0 | 2.0 | 2.0 | 2.0 | 2.0 | 2.0 | 2.0 | 2.0 |

TABLE 1-continued

|  | Com. Ex. 1 | Com. Ex. 2 | Com. Ex. 3 | Com. Ex. 4 | Com. Ex. 5 | Com Ex. 6 | Ex. 1 | Ex. 2 | Ex. 3 | Ex. 4 | Ex. 5 |
|---|---|---|---|---|---|---|---|---|---|---|---|
| Wax | 2.0 | 2.0 | 2.0 | 2.0 | 2.0 | 2.0 | 2.0 | 2.0 | 2.0 | 2.0 | 2.0 |
| Age resister | 2.0 | 2.0 | 2.0 | 2.0 | 2.0 | 2.0 | 2.0 | 2.0 | 2.0 | 2.0 | 2.0 |
| Vulcanization accelerator | 1.5 | 1.5 | 1.5 | 1.5 | 1.5 | 1.5 | 1.5 | 1.5 | 1.5 | 1.5 | 1.5 |
| Sulfur | 2.0 | 2.0 | 2.0 | 2.0 | 2.0 | 2.0 | 2.0 | 2.0 | 2.0 | 2.0 | 2.0 |
| Evaluation (Index) |  |  |  |  |  |  |  |  |  |  |  |
| Abrasion resistance | 100 | 95 | 98 | 97 | 100 | 95 | 100 | 100 | 100 | 102 | 103 |
| Increasing index of aging hardness | 100 | 110 | 106 | 110 | 100 | 98 | 95 | 95 | 90 | 90 | 87 |
| On-ice performance | 100 | 95 | 95 | 96 | 100 | 107 | 102 | 103 | 105 | 105 | 107 |
| Wet performance | 100 | 99 | 98 | 97 | 100 | 107 | 105 | 110 | 114 | 114 | 116 |

As is apparent from the results shown in Table 1 above, abrasion resistance, suppression of hardening due to thermal aging, and on-ice performance were deteriorated in Comparative Example 2 in which an amino acid type oil gelling agent was added, as compared with Comparative Example 1 which is a control. In Comparative Examples 3 and 4, oil absorption value of polymethyl methacrylate and silicone resin powder added was low. Therefore, the suppression effect of hardening due to thermal aging was not obtained, and on-ice performance and wet performance had the tendency to be deteriorated.

On the other hand, in Examples 1 to 3 in which oil absorptive polymer particles having high oil absorption value were added, as compared with Comparative Example 1, the suppression effect of hardening due to thermal aging was obtained without deteriorating abrasion resistance, and the improvement effect was observed in on-ice performance and wet performance. In Examples 1 to 3, the amounts of the oil absorptive polymer particles added are 12.5 parts by mass, 25 parts by mass and 50 parts by mass, respectively, per 100 parts by mass of the oil. The suppression effect of hardening due to thermal aging, on-ice performance and wet performance had the tendency to be improved as the amount of the oil absorptive polymer particles is increased.

Examples 4 and 5 are the examples using the oil-polymer composite. In Example 4, the content of the oil is 20 parts by mass per 100 parts by mass of the diene rubber, and the content of the oil absorptive polymer particles is 5.0 parts by mass per 100 parts by mass of the diene rubber, which are the same contents as in Example 2. In Example 5, the content of the oil is 20 parts by mass per 100 parts by mass of the diene rubber, and the content of the oil absorptive polymer particles is 10 parts by mass per 100 parts by mass of the diene rubber, which are the same contents as in Example 3. From the comparison between Example 2 and Example 4 and between Example 3 and Example 5, further improvement effect was obtained in the suppression effect of hardening due to thermal aging, on-ice performance and wet performance, by using the oil-polymer composite in which the oil absorptive polymer particles and the oil had been previously mixed with each other, and abrasion resistance was also improved.

From the comparison between Examples 1 to 3 and Comparative Example 6, when the amount of the oil absorptive polymer particles added was too large, abrasion resistance was deteriorated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rubber composition for a tire tread comprising a diene rubber, an oil, and oil absorptive polymer particles having an oil absorption value of from 100 to 1,500 ml/100 g, wherein a content of the oil absorptive polymer particles is from 2.5 to 60 parts by mass per 100 parts by mass of the oil and wherein the oil absorptive polymer particles have a glass transition temperature of from −70 to −500° C.

2. A rubber composition for a tire tread comprising: an oil-polymer composite comprising oil absorptive polymer particles having an oil absorption value of from 100 to 1,500 ml/100 g and an oil absorbed therein, and a diene rubber, wherein a content of the oil absorptive polymer particles is from 2.5 to 60 parts by mass per 100 parts by mass of the oil contained in the rubber composition, and wherein the oil absorptive polymer particles have a glass transition temperature of from −70 to −500C.

3. The rubber composition for a tire tread according to claim 1, wherein the diene rubber comprises at least one selected from the group consisting of natural rubber, polybutadiene rubber and styrene-butadiene rubber.

4. The rubber composition for a tire tread according to claim 2, wherein the diene rubber comprises at least one selected from the group consisting of natural rubber, polybutadiene rubber and styrene-butadiene rubber.

5. The rubber composition for a tire tread according to claim 1, wherein the oil absorptive polymer particles are porous.

6. The rubber composition for a tire tread according to claim 2, wherein the oil absorptive polymer particles are porous.

7. The rubber composition for a tire tread according to claim 1, wherein the oil absorptive polymer particles have an average particle diameter of from 10 to 1,000 pm in a state that the particles do not absorb the oil.

8. The rubber composition for a tire tread according to claim 2, wherein the oil absorptive polymer particles have an average particle diameter of from 10 to 1,000 m in a state that the particles do not absorb the oil.

9. A pneumatic tire having a tread rubber comprising the rubber composition according to claim 1.

10. A pneumatic tire having a tread rubber comprising the rubber composition according to claim 2.

* * * * *